(12) United States Patent
Huang (10) Patent No.: US 8,511,505 B2
(45) Date of Patent: Aug. 20, 2013

(54) SAFETY ENVIRONMENTAL PROTECTION BURIED OIL TANK

(75) Inventor: Xiaodong Huang, Beijing (CN)

(73) Assignee: Shanghai Huspeng Explosion-Proof Science and Technology Co., Ltd., Shanghai (CN)

( * ) Notice: Subject to any disclaimer, the term of this patent is extended or adjusted under 35 U.S.C. 154(b) by 800 days.

(21) Appl. No.: 12/280,340

(22) PCT Filed: May 11, 2007

(86) PCT No.: PCT/CN2007/001537
§ 371 (c)(1),
(2), (4) Date: Dec. 27, 2002

(87) PCT Pub. No.: WO2007/147316
PCT Pub. Date: Dec. 27, 2007

(65) Prior Publication Data
US 2010/0147857 A1 Jun. 17, 2010

(30) Foreign Application Priority Data
Jun. 13, 2006 (CN) .......................... 2006 1 0087378

(51) Int. Cl.
*B65D 88/76* (2006.01)
(52) U.S. Cl.
USPC ..................................... 220/567.1; 220/567.2
(58) Field of Classification Search
USPC .................. 220/567.1, 567.2, 565, 88.1, 88.2
See application file for complete search history.

(56) References Cited

U.S. PATENT DOCUMENTS

| 3,010,599 | A | * | 11/1961 | Haines, Jr. et al. | ...... 220/560.05 |
| 3,415,408 | A | * | 12/1968 | Seitz | .......................... 220/560.12 |
| 4,912,966 | A | * | 4/1990 | Sharp | .............................. 73/49.2 |
| 4,988,011 | A | * | 1/1991 | Fenton et al. | ................. 220/88.1 |
| 5,163,573 | A | * | 11/1992 | Kang | ............................ 220/88.2 |
| 5,390,580 | A | * | 2/1995 | Gibbons et al. | .................... 86/50 |
| 6,551,024 | B1 | * | 4/2003 | Berg et al. | ......................... 405/54 |
| 6,834,534 | B2 | * | 12/2004 | Halla et al. | ...................... 73/49.2 |
| 7,556,847 | B2 | * | 7/2009 | Seneor | .......................... 428/35.7 |
| 7,735,668 | B2 | * | 6/2010 | Richter | ........................ 220/4.21 |

FOREIGN PATENT DOCUMENTS

| CN | 1061942 A | | 6/1992 |
| CN | 2495611 Y | | 6/2002 |
| CN | 01144635.8 | | 7/2003 |
| CN | 1426937 | * | 7/2003 |
| CN | 1426937 A | | 7/2003 |
| CN | 1631748 A | | 6/2005 |
| CN | 1669785 A | | 9/2005 |

(Continued)

*Primary Examiner* — Luan K Bui
*Assistant Examiner* — Rafael Ortiz
(74) *Attorney, Agent, or Firm* — Fliesler Meyer LLP (57) ABSTRACT

A safe and environmental protection type underground oil tank can comprise a tank body of two-layer structure comprising an inner tank wall and an outer tank wall, an interlayer space formed between the inner tank wall and the outer tank wall, characterized in thai high porous explosion-proof materials in a plurality of units are respectively filled in a cavity of tank body and the interlayer space formed between the two-layer tank walls. The underground oil tank can also comprise an oil leak detection device being provided in the interiayer space between the two-layer tank walls, and an oil spill pool being established on a manhole cover of the tank body, and the bottom of this oil spill pool being in communication with the interiayer space between the two-layer tank walls.

14 Claims, 7 Drawing Sheets

(56) References Cited

FOREIGN PATENT DOCUMENTS

| CN | 1673608 A | 9/2005 |
| CN | 200510066233.2 | 9/2005 |
| CN | 200510067976.1 | 9/2005 |
| CN | 1651289 A | 10/2005 |
| CN | 1687631 A | 10/2005 |
| CN | 2734680 Y | 10/2005 |
| CN | 2808808 Y | 8/2006 |
| CN | 1850554 A | 10/2006 |
| JP | 59134189 | 8/1984 |
| JP | 63218086 | 9/1988 |
| JP | 1084896 A | 3/1989 |
| JP | 9058790 | 3/1997 |
| JP | 2001004221 | 1/2001 |

* cited by examiner

FIG. 9

SAFETY ENVIRONMENTAL PROTECTION BURIED OIL TANK

FIELD OF THE INVENTION

The present invention relates to an oil tank and more particularly relates to a safe and environmental protection type underground oil tank that may effectively prevent the filled oil from overflow and prevent the tank wall from seepage or leakage, and thus it pertains to the technical field of storage safety of the underground oil containers.

DESCRIPTION OF THE PRIOR ART

In the prior art, most of the storage tanks in the gasoline filling stations (gas filling stations), which are positioned in an underground tank pool, are constructed in an underground mode. The pool is a concrete pool generally. The cavity between the tank pool and the tank body is compacted with the neutral fine sands or sandbags. The coverage thickness of tank lid should not be less than 0.5 meter, and the filling thickness around the tank body should not be less than 0.9 meter. The purpose of filling sand soil in the tank pool is to guarantee that no air exists between the tank pool and the tank body so that the air and oil can not mix, thus to have the effect of the explosion-proof. In the process of oil filling, the storage tanks may occur the phenomena such as overflow and ebullition due to the operation failure, and the overflowed gasoline may be absorbed by the sand soil immediately. Since the construction of the underground storage tanks involves a large consumption of the sand, the engineering has a high difficulty. Some gasoline filling stations are not implanted the construction works according to above specifications but merely be filled some sand at the bottom of the tank pool or even be filled no sand. Thus it brings about very serious hidden troubles. Furthermore, due to the seepage or leakage occurred on the tank wall in the process of application as well as the foundation settlement of the tank pool, fissures may occur on the waterproof layer at the bottom of the tank pool, so that the contents in the tank may easily penetrate through the tank wall, thus generating the irretrievable damages to the soil and underground water resources around the tank body. In addition, at present some of underground type oil tanks are designed as the single walled tanks, and some of overground oil tanks are designed as double walled tanks with the major purposes of the impact resistant and heat insulation. That is to say, the technical defect in the structures of existing oil tanks consist in that it is impossible to timely detect and deal with the phenomena such as overflow and ebullition occurred in the process of oil filling as well as the problem such as seepage or leakage of the oil tank wall, so that there are the significant hidden troubles in the present structures of the oil tanks.

The vertical well and decontamination tunnel are provided in the underground oil tank of the present invention. The tank is filled with the separating explosion-proof materials. These have been disclosed in the previous patent applications of the applicant, such as Chinese patent No. ZL01144635.8 and the Chinese patent application Nos.: CN200510067976.1 and CN200510066233.2, which are incorporated herewith by reference.

SUMMARY OF THE INVENTION

The first technical object of the present invention is to provide a safe and environmental protection type underground oil tank to overcome the deficiency of the prior art. Since the separating explosion-proof materials are provided in this oil tank, it is possible to prevent the accidental combustion and explosion accidents initiated by naked fire, static electricity, welding, gunshot, collision and misoperation, and ensure the safety of the oil tank.

The second technical object of the present invention is to provide a safe and environmental protection type underground oil tank to overcome the deficiency of prior art. Designed as the double walled tank, the oil tank can effectively overcome seepage or leakage of oil and gas and thus can avoid serious damages to the soil around the gasoline filling stations and destruction of underground water resources. An oil leak detection device is provided in the cavity of the double walled tank, so that it is possible to detect the volatilization of oil and gas in time and make the repairing welding tank wall in case of charged oil. At the same time, an oil spill pool is provided on the manhole of tank body, so it is possible to prevent such phenomena as oil spill and ebullition from occurrence in the process oil filling and to adopt the countermeasures in time upon detection of such phenomena.

The above technical objects of the present invention are achieved through the following technical solutions:

A safe and environmental protection type underground oil tank has a tank body of two-layer structure composed of an inner tank wall and an outer tank wall, an interlayer formed between the inner tank wall and outer tank wall. The separating explosion-proof materials are respectively filled in the cavity of tank body and the interlayer formed between the two-layer tank walls. An oil leak detection device is provided in the interlayer. An oil spill pool is established on the manhole cover of the tank body, and the bottom of this oil spill pool is connected with the interlayer.

For the convenience in the maintenance and decontamination, a vertical well is provided in the tank body, with its top end being provided on the position which corresponds to the manhole cover on the tank body. The vertical well is a framework vertically penetrating the tank body along the radial direction, and the upper and lower circular arc-shaped end plates are respectively provided on its both ends. More than one internal bladders are provided in the framework of the vertical well, and each of internal bladders is filled with the separating explosion-proof material. A decontamination tunnel is provided at the bottom inside the tank body. This decontamination tunnel is defined by a hemicycle metal mesh and a support frame located on the lower part of the metal mesh. The two ends of the decontamination tunnel tightly abut against the inner wall of tank body. The metal mesh is also covered with a layer of filter screen. In general, the separating explosion-proof materials respectively filled in the inner cavity of tank body and in the interlayer have different structures. The separating explosion-proof materials filled in the cavity of tank body are the separating explosion-proof units, which include the framework defined by the angle steels. A mesh fence braided with steel wire is provided outside of the framework, and the flaky materials or spheroid materials with a high porous structure are filled in the framework. The separating explosion-proof materials filled in the interlayer of the tank body are the flaky materials with the high porous structure, which are wrapped around the outer wall of the inner tank body in multiple layers and filled in the interlayer space. According to the different requirements for application, the shape of the framework for the separating explosion-proof unit body may be designed as cube, cuboid, triangular prism, circular cylinder or irregular form. To monitor and deal the occurrence of oil spill and ebullition in the process of oil filling in time, an oil leak detection device is provided in said oil spill pool, which is connected with a signal conversion/ power amplification controller and a warner.

In conclusion, the advantageous effects of the present invention are as follows.

1. Since the separating explosion-proof materials are provided in the oil tank, it is possible to prevent the accidental combustion and explosion accidents initiated by naked fire, static electricity, welding, gunshot, collision and misoperation, and ensure the intrinsic safety of the oil tank.

2. As the oil tank has a double walled tank structure, it may effectively overcome the leakage and/or leak of oil and gas and thus avoid the serious damages to the soil around the gasoline filling station and destruction of underground water resources;

3. An oil leak detection device is provided in the cavity of double walled tank, so that it is possible to detect the volatilization of the mixture of the oil and gas in time and make the repairing welding tank wall in case of charged oil;

4. An oil spill pool is provided on the manhole of tank body, so that it is possible to prevent such phenomena as oil spill and ebullition in the process of the oil filling and to adopt the countermeasures in time upon detection of such phenomena.

Further detailed description of the technical proposals of the present invention will be provided herein in combination with attached drawings and specific embodiments.

The major reference signs are described as follows:

1 Tank body, 11 Inner tank wall, 12 Outer tank wall, 121 Splice bar, 13 Interlayer, 14 Manhole cover;

2 Detection device, 21 Signal conversion/Power amplification controller, 22 Warner connection, 23 Probe;

3 Separating explosion-proof material, 31, 31', 31" Separating explosion-proof material unit, 311 framework, 311' cuboid framework, 311" Triangular prism framework, 312 filler, 32 crisscross fixed plate;

4 Oil spill pool, 41 Oil leak hole, 42 Rain-proof cover plate; 5 Vertical well;

6 Decontamination tunnel; 61 Mesh fence;

7 Anti-corrosive coating, 8 Heat insulating layer, 9 Oil drain valve, 10 Bulkhead.

DETAILED DESCRIPTION OF THE PREFERRED EMBODIMENTS

Example 1

Figure 1:
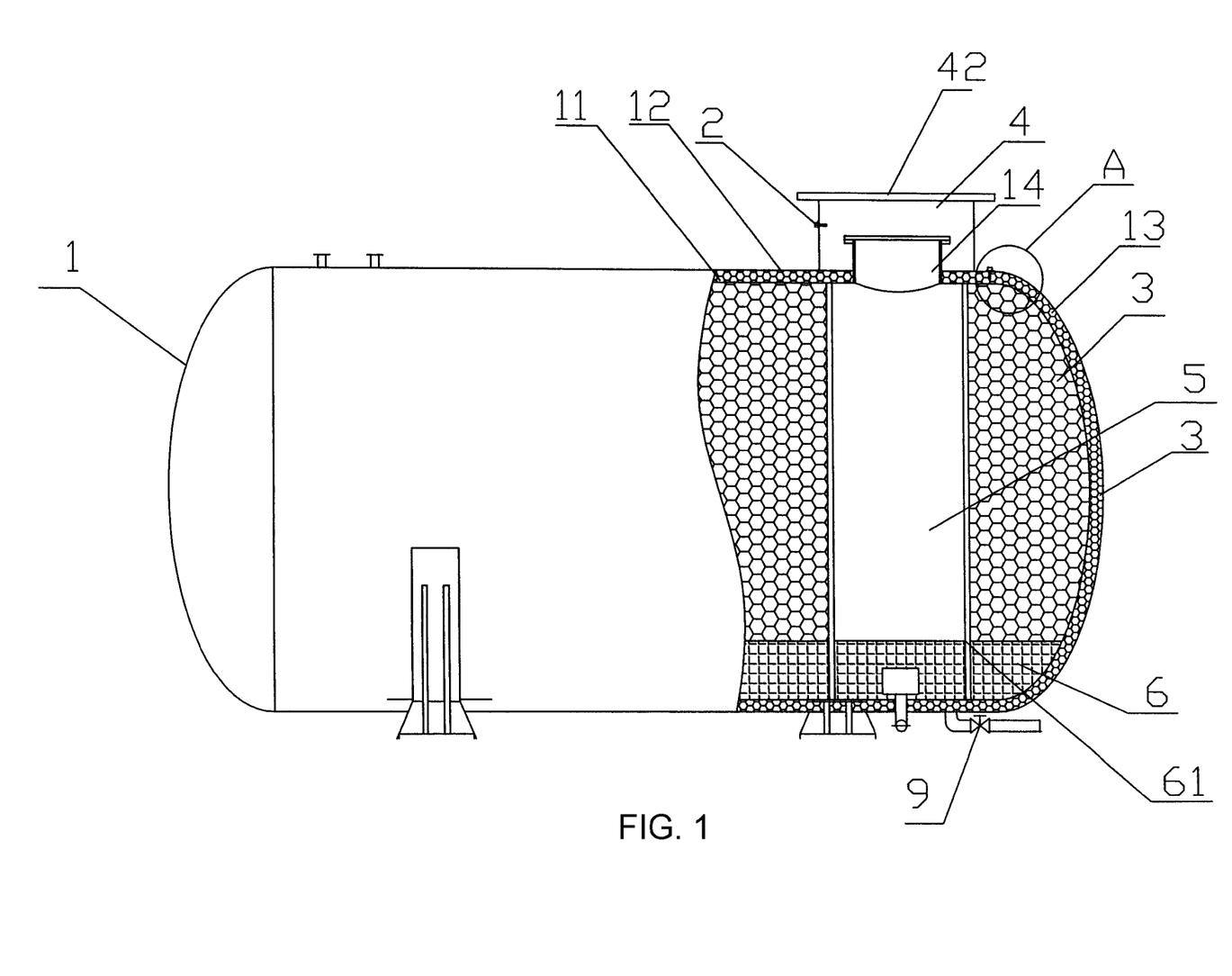
FIG. 1 is the overall structural representation of the present invention.
Figure 2:
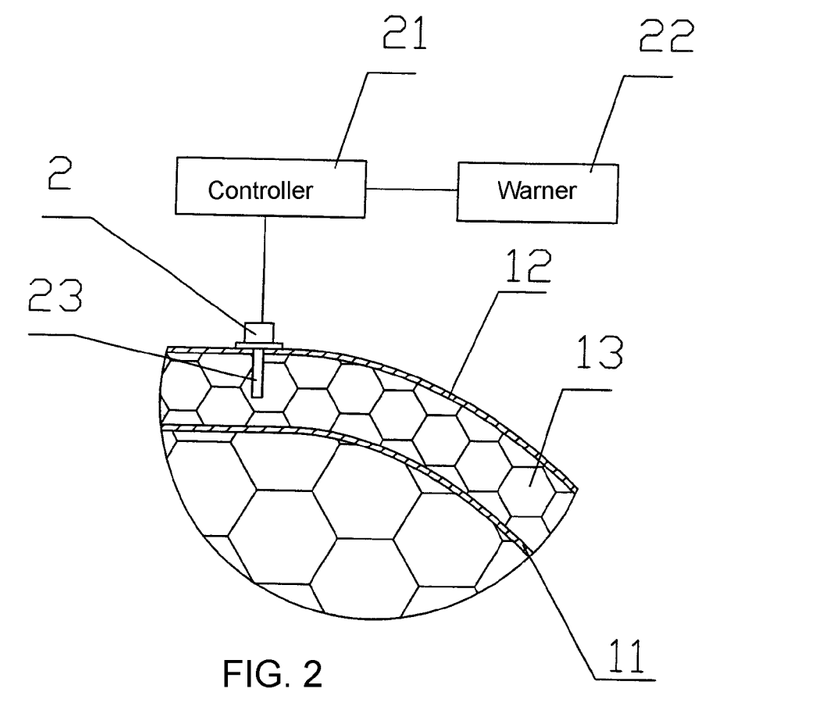
FIG. 2 is the partial enlarged drawing of Part A in FIG. 1 of the present invention.

FIG. 1 is an overall structural representation of the present invention. As shown in FIG. 1, the present invention provides a safe and environmental protection type underground oil tank. The tank body 1 has a two-layer structure composed of an inner tank wall 11 and an outer tank wall 12. An interlayer 13 is formed between the inner and outer tank walls. In general, the separating explosion-proof materials 3 respectively filled in the inner cavity of tank body 1 and in the interlayer 13 have different structures. The separating explosion-proof materials 3 filled in the inner cavity of tank body 1 are separating explosion proof unit 31, while the separating explosion-proof materials 3 filled in the interlayer 13 are the flaky materials with a high porous structure, which are wrapped on the outer wall of the inner tank body in multiple layers and completely filled in the space of interlayer 13. FIG. 2 is the partial enlarged drawing of Part A in FIG. 1 of the present invention. As illustrated in FIG. 2, an oil leak detection device 2 is provided in the interlayer 13 of the two-layer tank, and is connected with a signal conversion/power amplification controller 21 and a warner 22. The probe 23 of detection device 2 is extended to the inside of interlayer 13. Upon occurrence of seepage or leakage of the tank body, the leaky oil vapor may quickly spread into the interlayer 13 of two walled tank, the probe 23 of detection device 2 immediately detecting the mixture of the diffused oil and gas and, through the signal conversion/power amplification controller 21, transmitting the detected signal to the warner 22 and thus giving an alarm. So it is possible to make repairing welding in time upon the immediate detection of such circumstance, and thus avoid the damages to the soil around the gasoline filling station and the pollution of underground water resources. Under general conditions, in practical applications, said detection device 2 may be commercially available XP-314 mode flammable gas detector which is a gas heat conduction type and may detect manufactured gas, natural gas, $CH_4$, $H_2$, He and $CO_2$, with the detection range 0-100 vol. %. As shown in FIG. 1, the inner cavity of the tank body 1 is filled with the separating explosion-proof materials 3, and an oil spill pool 4 is provided on the manhole cover 14 of the tank body 1 the bottom of which is in communication with the interlayer 13. So that the safety and explosion proof performance of the oil tank may be further improved.

As shown in FIG. 1, for the convenience in the maintenance and decontamination of the oil tank, a vertical well 5 is provided in the tank body 1. The structure of this vertical well 5 is the same as that described in the patent of invention titled "Separating and explosion-proof underground oil tank capable of cleaning and maintenance" (Chinese patent No: ZL01144635.8). The top end of the well is provided on the position which corresponds to the manhole cover 14 on the tank body 1; The vertical well is a framework vertically extending through the tank body 1 along its radial direction, and the upper and lower circular arc-shaped end plates are respectively provided on its both ends (Not shown in the Figure). More than one internal bladders are provided in the framework of the vertical well 5, and each of internal bladders is filled with the flaky separating explosion-proof materials or spheroids. At the same time, the decontamination tunnel 6 is also provided at the bottom of the inner cavity of the tank body 1. As described in patent of invention titled "Separating and explosion proof underground oil tank capable of cleaning and maintenance" (patent No. ZL01144635.8), the decontamination tunnel 6 is defined by a hemicycle metal mesh and a support frame located on the lower part of the metal mesh. The two ends of the decontamination tunnel 6 tightly abut against the inner wall of tank body 1. The metal mesh is also covered with a layer of filter screen 61.

Figure 3:
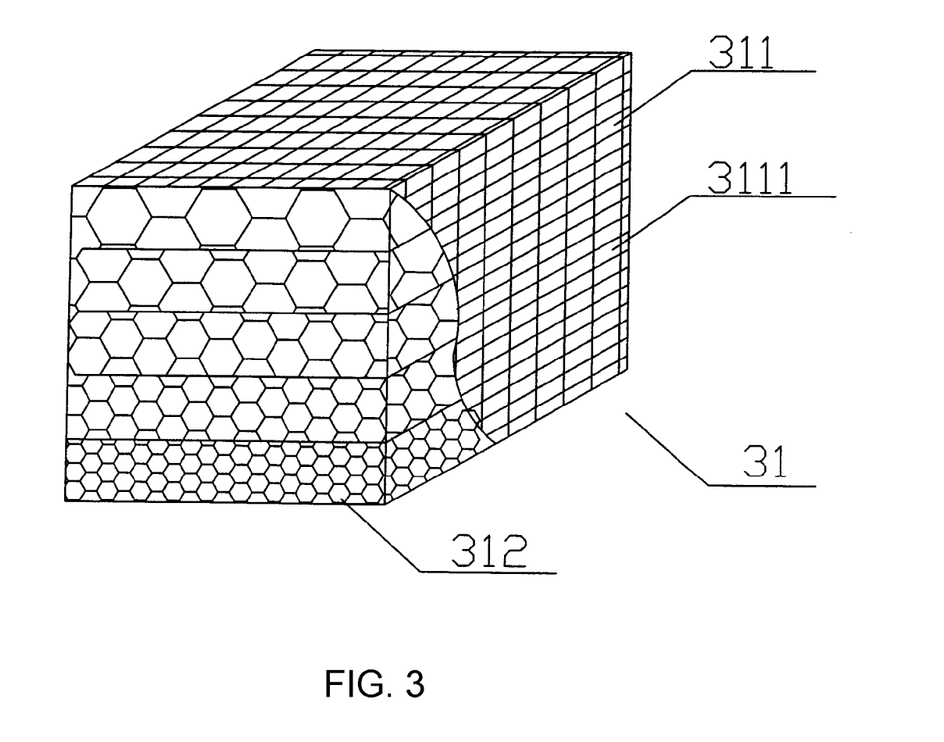
FIGS. 3-5 are the structural representations of the separating explosion-proof material units of the present invention.
Figure 4:
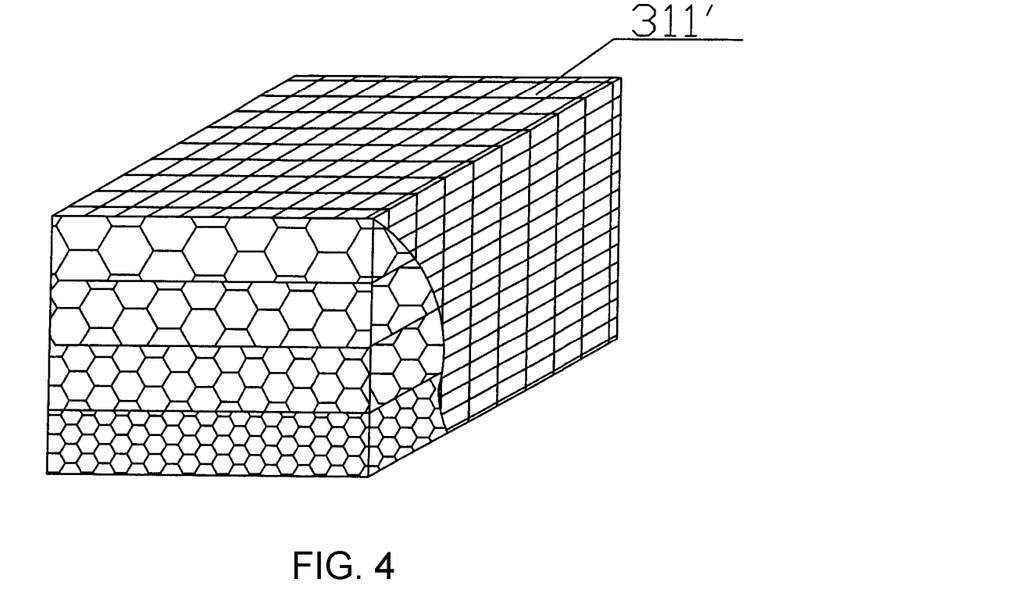
Figure 5:
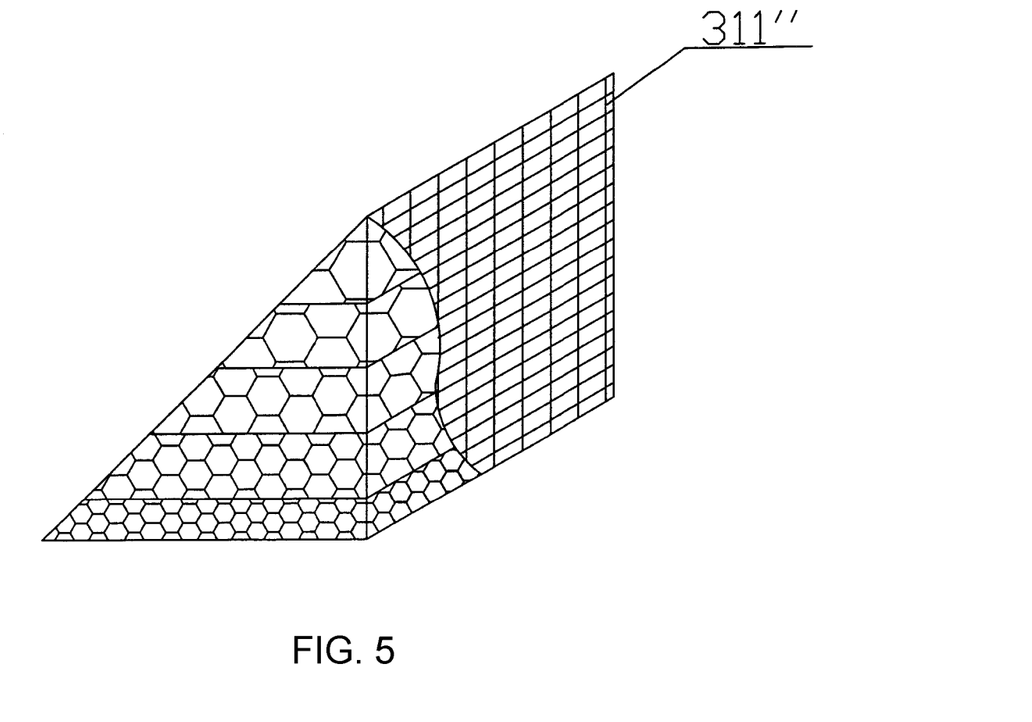

In the practical application, the separating explosion-proof materials 3 respectively filled in the interlayer 13 and in the inner cavity of the tank body 1 are different in structure. The separating explosion-proof materials 3 filled in the tank body 1 are composed of more than one separating explosion-proof material unit 31. In this regard, it is advisable to refer to the application for patent of invention titled "Separating explosion-proof material" (application No: CN200510067976.1) or application for patent of invention titled "Separating explosion-proof material unit" (application No: CN200510066233.2). FIGS. 3-5 are the structural representations of the separating explosion-proof material units of the present invention. As exemplified in FIG. 3, the separating explosion-proof material unit 31 includes the framework 311 defined by the angle steels, a mesh fence 3111 braided with steel wire, which is provided on outside of the framework 311 for preventing the media from mixing the scraps of materials. Reticulated materials 312 (or spheroid materials) with the flaky high porous structure are filled in the framework 311 and are made from the special metal foil which is further processed into the latticework or spheroids (the spheroids are made by reprocessing of flaky materials) with the flaky high porous structure by a net drawing machine. In the framework 311, the pores of the filled reticulated materials 312 may be arranged in a progressive manner from top to bottom and from large to small. As shown in FIGS. 4 and 5, the framework 311 of the separating explosion-proof material units 31 may be designed as various shapes, so as to adapt to the different positions in the oil tank in which these explosion-proof material units are actually filled. There are different choices for their shapes, for example, the framework 311 may be a cube as shown in FIG. 3, a cuboid framework 311' as shown in FIG. 4, a triangular prism framework 311" as shown in FIG. 5 or designed in a circular cylinder or an irregular form etc.

Figure 6:
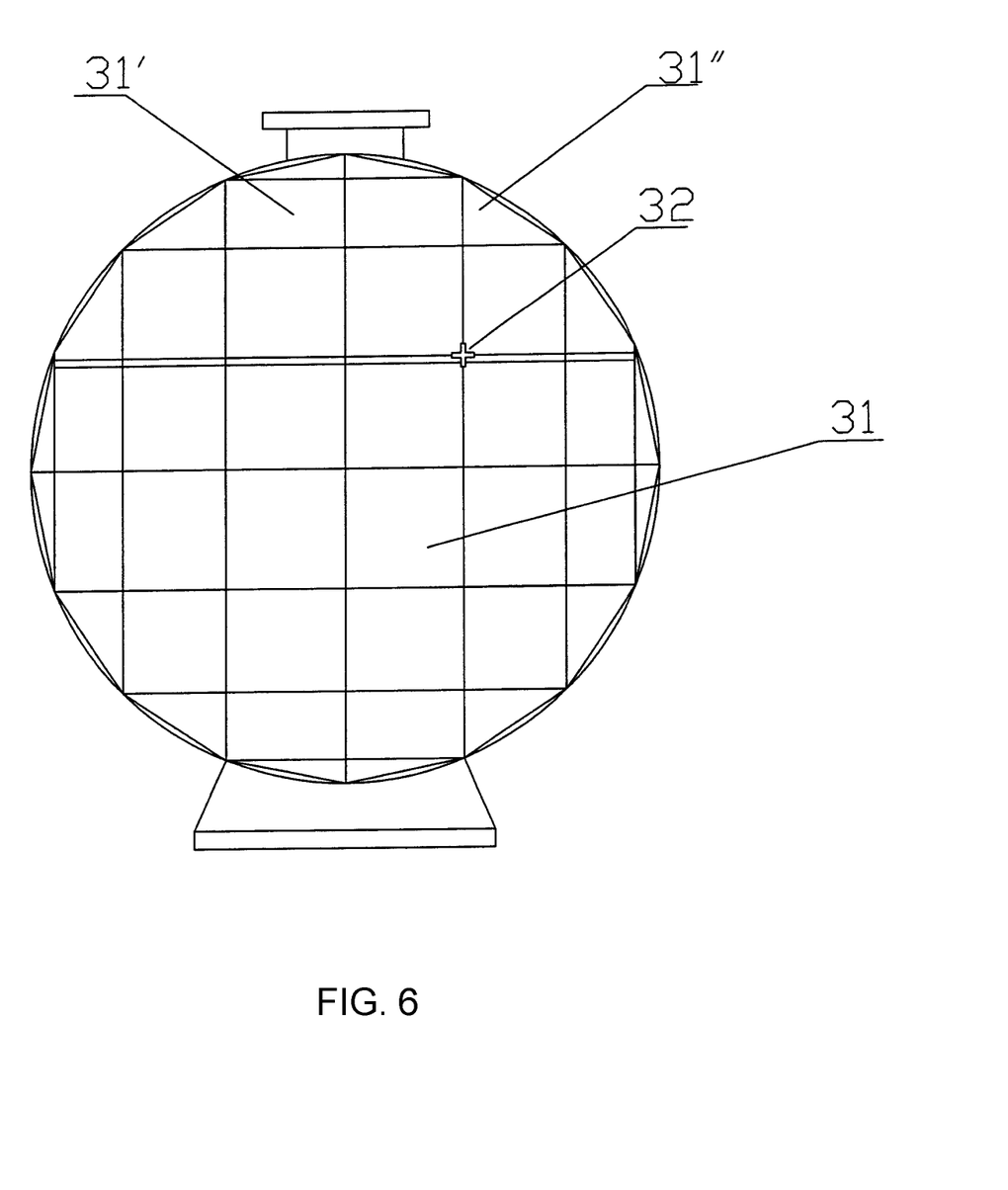
FIG. 6 is the structural representation of the separating explosion-proof material units filled in the oil tank of the present invention.

FIG. 6 is the structural representation of the separating explosion-proof material unit filled in the oil tank of the present invention. As illustrated in FIG. 6, in the process of filling the separating explosion-proof material units to the oil tank, the separating explosion-proof material units 31" with triangular prism framework 311" are adopted around the tank body wall of the oil tank, the separating explosion-proof material units 31' with a cuboid framework 311' are adopted in the middle. At the same time, the crisscross fixed plate 32 is used for fixing the framework of the separating explosion-proof material units. In the end, it is required to fill the separating explosion-proof material units 31 with cube or cylindrical form framework 311 (not shown in the Figure) in the λ-shaped hole, so as to complete the process of filling. For filling the horizontal tank, it is necessary to consider the form of the separating explosion-proof material unit in the hemicycle spheres on both sides additionally. In cleaning the tank body and the separating explosion-proof materials in the tank, it is merely required to move the separating explosion-proof material unit out of tank in turn and empty the tank body. The time saving cleaning process is also featured by the convenient operation and low labor intensity.

Figure 7:
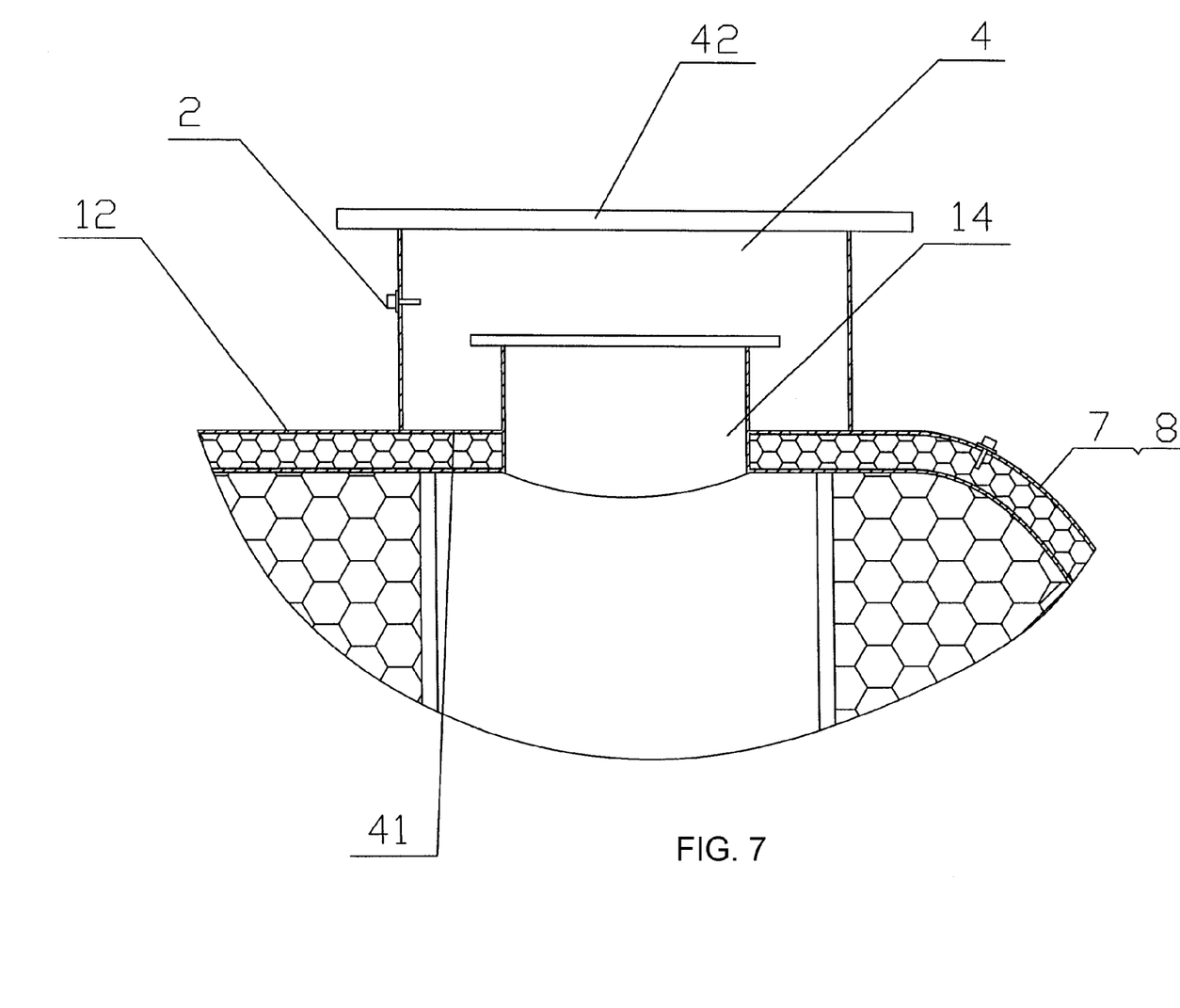
FIG. 7 is the partial structural representation of oil spill pool of the present invention.

FIG. 7 is the partial structural representation of oil spill pool of the present invention. As illustrated in FIG. 7, an oil leak hole 41 is provided at the bottom of the oil spill pool 4. With the arrangement of the oil leak hole 41, the oil spill pool 4 and the interlayer 13 of the tank body 1 are in communication with each other. To improve the safety performance of this oil tank and achieve the object of being able to adopting the countermeasures upon occurrence of such phenomena as oil spill and ebullition in the process of filling oil to the oil tank, an oil leak detection device 2 is also provided in the oil spill pool 4, which is composed of the probe 23, the signal conversion/power amplification controller 21 and the warner 22. When the oil vapor in the oil leak hole 41 has leaked into the interlayer 13 of the tank body 1, the probe 23 in the oil leak detection device 2 also provided in the interlayer 13 will detect the leaky oil vapor, and thus generated electrical signals are transmitted to the warner 22 by way of the signal conversion power amplification controller 21. Upon receipting of the signal, the warner 22 will give an alarm to remind the operation staffs of adopting the relevant measures. This twofold arrangement of the oil leak detection devices may not only improve the detection sensitivity but also prevent missing detection of the oil vapor leakiness due to the failure in one of the detection devices, and thus avoid the potential safety hazards. To prevent pollution, a rainproof cover plate 42 is provided on the upper part of the oil spill pool 4.

Figure 8:
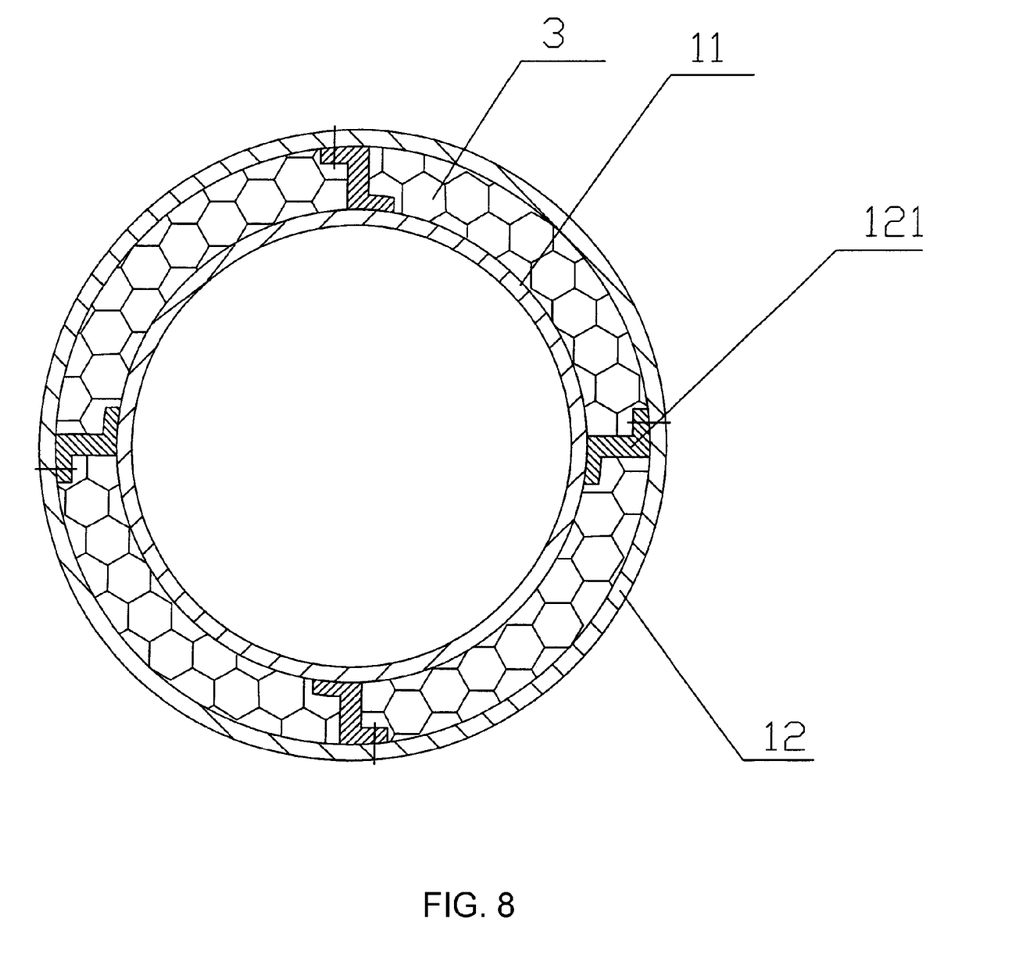
FIG. 8 is the structural representation of the splice bar on the inner wall of the oil tank of present invention.
Figure 9:
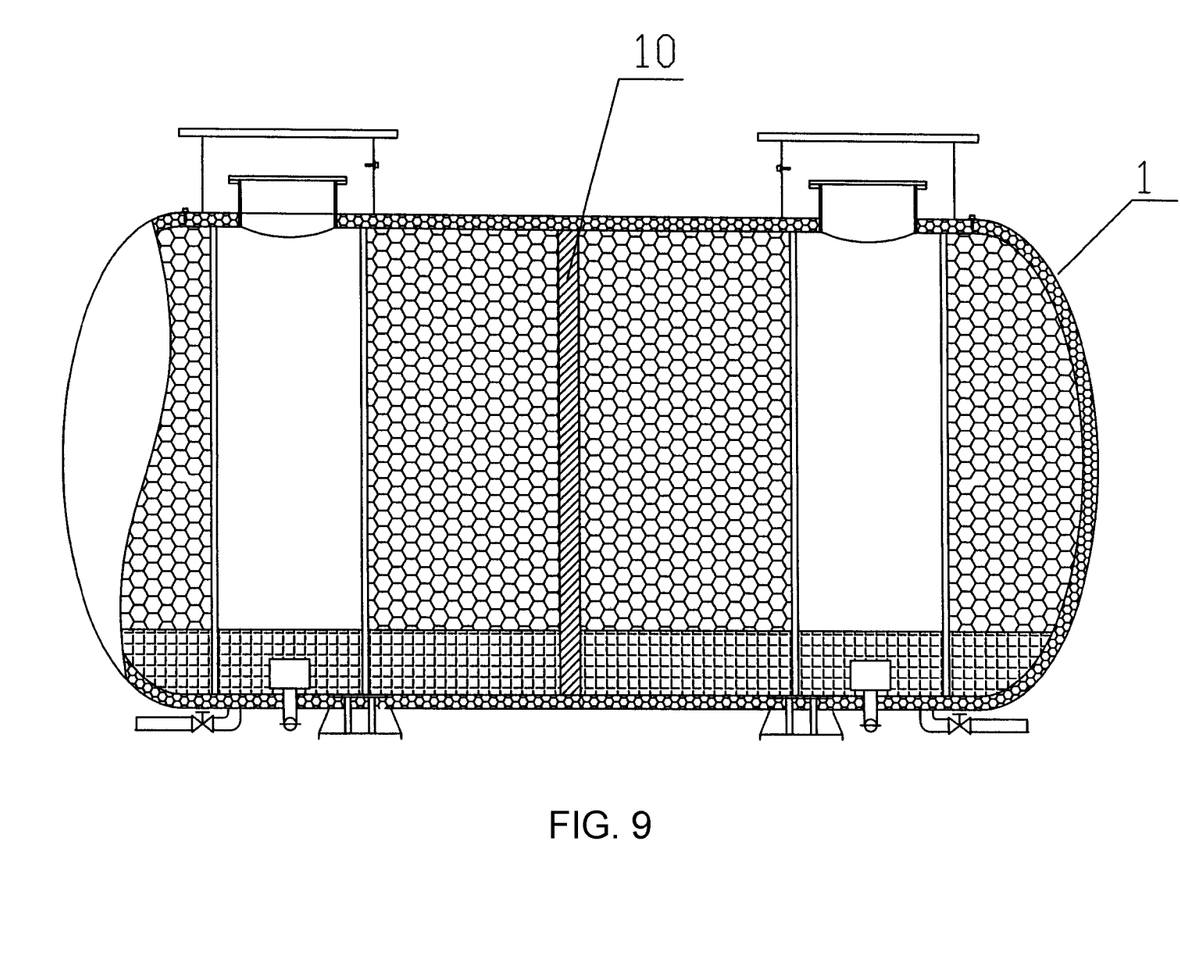
FIG. 9 is the internal structure representation of the tank body configured with a bulkhead of present invention.

FIGS. 8 and 9 are respectively the partial structural representation of the two-layer tank walls of the oil tank of present invention and the structural representation of the splice bar on the inner wall of the oil tank of present invention. As illustrated in FIG. 8, the inner tank wall 11 and the outer tank wall 12 of the tank body 1 are made of the carbon steel Q235 and have the different wall thickness. Generally, the thickness of the outer tank wall is smaller than that of the inner tank wall, mainly because the outer tank wall plays the role of protection. During the processing of the tank body 1, as a general rule, it is required to divide the outer tank into two halves of outer tank bodies for processing and then combine these two halves and envelop the inner tank, according to the routine processing method for the tank body. Therefore, as shown in FIG. 9, the splice bar 121 is fixed on the outside of the inner tank wall 12, which is used for the connection and support between the inner tank wall and the outer tank wall. The splice bars 121 are usually provided at intervals along the straight axial direction of the tank body 1, with the preferred width of 40-50 millimeter. However, the interval between the inner tank wall and the outer tank wall, namely the thickness range of the interlayer 13 is 30-50 millimeter. As shown in FIG. 7, to achieve better effect of oil storage, an anti-corrosive coating 7 and a heat insulating layer 8 are also provided on the outer wall of the oil tank. The anti-corrosive coating 7 is coated on the outer tank wall by adopting asphalt anti-corrosive covering material of extra reinforcement grade. Sometime, the epoxy asphalt anti-corrosive materials of extra reinforcement grade are adopted to provide the anti-corrosive protection for the outer tank wall.

In addition, as shown in FIG. 1, an oil drain valve 9 is provided at the bottom of the tank body 1; one end of this oil drain valve 9 is connected with the interlayer 13, and the other end is connected with the cavity of tank body 1, which is designed to draw back the overflow media in the tank body 1.

Example 2

FIG. 9 is the internal structural representation of the tank body configured with the bulkhead of present invention. As illustrated in FIG. 9, one or more of bulkheads 10 may be provided inside the tank body 1 of the oil tank, which divides the volume of tank body 1 into two or more relatively independent cabins. The arrangement of bulkheads 10 enhances the intensity of the tank body of the oil tank, and on the other hand divides the oil tank into the independent cabins, so that the oil tank may contain two or more gasoline products with different labels such as 90#, 93# and 97# etc, thus meeting the requirement that various kinds of oil products may be stored in the same oil tank.

It is necessary to note that, in this embodiment it is required to set up a decontamination channel in each of cabins and to set up corresponding drainage valve so as to facilitate decontamination and blowdown in time.

The present invention provides a safe and environmental protection type underground oil tank which has a tank body of two-layer structure composed of an inner tank wall and an outer tank wall; an interlayer formed between the inner tank wall and the outer tank wall; the separating explosion-proof materials respectively filled in the cavity of tank body and the interlayer formed between the two-layer tank walls; an oil leak detection device provided in the interlayer between the two-layer tank walls; as well as an oil spill pool established on the manhole cover of the tank body, the bottom of the oil spill pool being connected with the interlayer between the two-layer tank walls. Since the separating explosion-proof materials are provided in the oil tank, it is possible to prevent the accidental combustion and explosion accidents initiated by naked fire, static electricity, welding, gunshot, collision and misoperation, and thus ensure the intrinsic safety of oil tank. With the double walled tank structure, the oil tank may effectively overcome the leakage and/or leak of oil and gas and thus avoid serious damages to the soil around the gasoline filling station and destruction of underground water resources. At the same time, an oil leak detection device is provided in the cavity of the double walled tank, so that it is possible to detect the volatilization of oil and gas in time and thus make repairing welding the tank wall in case of charged oil. An oil spill pool is provided on the manhole of the tank body, so that it is possible to prevent such phenomena as oil spill and ebullition in the process of the oil filling and to adopt the countermeasures in time upon detection of such phenomena.

The invention claimed is:

1. A safe and environmental protection type underground oil tank, comprising
   a tank body of two-layer structure comprising an inner tank wall and an outer tank wall, an interlayer space formed between the inner tank wall and the outer tank wall, characterized in that high porous explosion-proof materials in a plurality of units are respectively filled in a cavity of tank body and the interlayer space formed between the two-layer tank walls,
   an oil leak detection device being provided in the interlayer space between the two-layer tank walls, and
   an oil spill pool being established on a manhole cover of the tank body, and the bottom of this oil spill pool being in communication with the interlayer space between the two-layer tank walls,
   wherein said explosion-proof materials filled in the interlayer space of tank body are wrapped around the outer wall of the inner tank body in multiple layers and completely filled in the interlayer space, wherein said high porous explosion-proof materials filled in the inner cavity of the tank body are contained in a plurality of explosion proof units, each of which include a framework defined by angle steels, a mesh fence braided with a steel wire provided outside of the framework, and high porous materials filled in the framework, wherein the plurality of explosion proof units are in different shapes to adapt to different positions in the oil tank in which the high porous explosion-proof materials are filled.

2. The safe and environmental protection type underground oil tank of claim 1, characterized in that a vertical well is provided in the tank body, with a top end of the vertical well disposed on the position which corresponds to the manhole cover in the tank body, the vertical well being a framework vertically extended through the tank body along the radial direction of the tank body, and one or more upper and lower circular arc-shaped end plates being respectively provided on both ends of the framework, more than one internal bladders being provided in the framework of the vertical well, and each of internal bladders being filled with the separating explosion-proof materials.

3. The safe and environmental protection type underground oil tank of claim 1, characterized in that a decontamination tunnel is provided at a bottom inside the tank body, which is defined by a hemicycle metal mesh and a support frame located on the lower part of the metal mesh, the two ends of the decontamination tunnel tightly abutting against the inner wall of the tank body, the metal mesh being covered with a layer of filter screen.

4. The safe and environmental protection type underground oil tank of claim 1, characterized in that an oil leak detection device is provided in said oil spill pool.

5. The safe and environmental protection type underground oil tank of claim 1 or 4, characterized in that said oil leak detection device is composed of a probe, a signal conversion/power amplification controller and a warner; an electrical signal generated after detection by the probe being transmitted to the warner through the signal conversion/power amplification controller, and the warner giving an alarm after receipting of the signal.

6. The safe and environmental protection type underground oil tank of claim 1, characterized in that said inner tank and outer tank differ in wall thickness, and the thickness of the outer tank wall being smaller than that of the inner tank wall.

7. The safe and environmental protection type underground oil tank of claim 1, characterized in that splice bars are provided outside of said inner tank wall, which are used for supporting and connecting the inner tank wall and the outer tank wall.

8. The safe and environmental protection type underground oil tank of claim 7, characterized in that said splice bars are provided at intervals along the axial direction of the tank body.

9. The safe and environmental protection type underground oil tank of claim 1, characterized in that the range of the interval between said inner tank wall and said outer tank wall is 30-50 millimeter.

10. The safe and environmental protection type underground oil tank of claim 1, characterized in that an anti-corrosive coating is provided on the outer wall of said oil tank.

11. The safe and environmental protection type underground oil tank of claim 10, characterized in that a heat insulating layer is provided outside of said anti-corrosive coating.

12. The safe and environmental protection type underground oil tank of claim 1, characterized in that an oil drain valve is provided at the bottom of the outer wall of said tank body, which is designed to draw back the overflow gasoline in the interlayer space to the tank body again, one end of the valve being connected with the interlayer space, and the other end being connected with the cavity of the tank body.

13. The safe and environmental protection type underground oil tank of claim 1, characterized in that bulkheads are provided in said cavity of the tank body so as to separate the tank body into more than one closed cavity for storage of the different oil product in the same oil tank.

14. A method for providing a safe and environmental protection type underground oil tank, comprising
   providing a tank body of two-layer structure comprising an inner tank wall and an outer tank wall, an interlayer space formed between the inner tank wall and the outer tank wall, characterized in that high porous explosion-proof materials in a plurality of units are respectively filled in a cavity of tank body and the interlayer space formed between the two-layer tank walls, wherein said explosion-proof materials filled in the interlayer space of tank body are wrapped around the outer wall of the inner tank body in multiple layers and completely filled in the interlayer space, wherein said high porous explosion-proof materials filled in the inner cavity of the tank body are contained in a plurality of explosion proof units, each of which include a framework defined by angle steels, a mesh fence braided with a steel wire provided outside of the framework, and high porous materials filled in the framework, wherein the plurality of explosion proof units are in different shapes to adapt to different positions in the oil tank in which the high porous explosion-proof materials are filled,  providing an oil leak detection device being provided in the interlayer space between the two-layer tank walls, and  providing an oil spill pool being established on a manhole cover of the tank body, and the bottom of this oil spill pool being in communication with the interlayer space between the two-layer tank walls.

* * * * *